INVENTOR
W. H. SCHEER
BY James W. Falk
ATTORNEY

INVENTOR
W. H. SCHEER
BY [signature]
ATTORNEY

INVENTOR
W. H. SCHEER
BY [signature]
ATTORNEY

Sept. 15, 1964 W. H. SCHEER 3,149,206

TRANSLATOR CONTROL CIRCUIT

Filed March 27, 1961 6 Sheets-Sheet 4

INVENTOR
W. H. SCHEER
BY [signature]
ATTORNEY

INVENTOR
W. H. SCHEER
BY
ATTORNEY

INVENTOR
W. H. SCHEER
BY [signature]
ATTORNEY

United States Patent Office 3,149,206

Patented Sept. 15, 1964

3,149,206
TRANSLATOR CONTROL CIRCUIT

William H. Scheer, Granville, Ohio, assignor to Bell Telephone Laboratories, Incorporated, New York, N.Y., a corporation of New York Filed Mar. 27, 1961, Ser. No. 98,359
10 Claims. (Cl. 179—18)

This invention relates to automatic telephone switching systems and, more particularly, to the determination of type of traffic information within such systems.

A complex telephone switching network provides for communication not only between subscribers served by a single telephone switching center, but also provides for communication between subscribers served by different switching centers which are often separated by great distances. Since it is impossible to provide direct communication between all offices in a nationwide switching network, calls which originate in one switching center are often switched through one or more switching centers and then are connected to a distant subscriber through a terminating switching center. There are therefore four basic types of traffic that a switching center may be called upon to handle. These are intraoffice calls, outgoing calls, terminating calls, and tandem calls. The intraoffice call is the most common type of traffic handled wherein a calling subscriber, served by a telephone switching center, indicates a desire to be connected to another subscriber served by the same telephone switching center. When a subscriber served by one telephone switching center indicates a desire to be connected to a subscriber served by another telephone switching center, the first center is engaged in outgoing traffic and the second center is engaged in terminating traffic. As indicated above, in a complex switching network calls are often routed through a switching center without connecting to a subscriber served by that center. On such calls the center through which the call is switched is handling tandem traffic.

In a common control telephone switching system such as the crossbar switching system of the type disclosed in A. J. Busch Patent 2,585,904 which issued February 19, 1952, the common control apparatus, for the purposes of routing and billing, requires an indication of the type of traffic being handled, that is, the common control in processing a call must know whether the call is an intraoffice call, an originating call, a terminating call, or a tandem call.

Patent 2,585,904 of February 19, 1952, to A. J. Busch discloses the switching circuit operations required to complete an intraoffice call and an outgoing call. The circuit operations involved in an incoming call are described in Patent 2,535,661 to A. O. Adam, Jr. and R. C. Avery, of December 26, 1960. Patent 2,587,817 to A. J. Busch and Henry J. Michael, of March 4, 1952, discloses the circuitry involved in switching a tandem call.

The most common means of identifying a particular central office is through the use of a central office designation which usually is comprised of the first three digits of a telephone directory number. A switching system must determine both the origin and the destination of any call in order to establish the desired connection. In other words, a switching system must recognize the type of traffic represented by a call through associating the called and the calling lines and their respective directory numbers. The usual procedure in distinguishing between intraoffice, outgoing, incoming, and tandem types of traffic has been through examination of the central office designation of the called line directory number in association with the equipment source which transmits the called line address code to the common control equipment. Certain types of traffic are peculiar to particular types of registers or trunks and, as such, are readily distinguished. However, a tandem trunk may be used to terminate at either the local central office or a remote central office and therefore requires an examination of the called line central office designation to determine that particular central office which serves the called line.

The above-described methods for determining types of traffic are satisfactory as long as central office designations are not duplicated. However, the occasion may arise when it is advantageous to provide two central offices with identical central office code designations. When this occurs, type of traffic and routing information is not available from the central office designation of the called line directory number as the common control equipment cannot distinguish between two central offices having the same code designation.

There are many situations which may present this problem. For example, when existing switching equipment is replaced with new equipment, it is sometimes not desirable to transfer all the lines served by the existing equipment to the new equipment at one time and, since it also is not desirable to change directory numbers on a temporary basis, it becomes necessary to have two distinct central offices with the same code designation. In another similar situation a satellite office might advantageously be assigned the same central office code designation as the master office when other designations are scarce due to numbering plan problems. A further such occasion may arise when it is desired to test a new type of switching system through serving a group of lines normally served by an existing central office without changing the central office code designation.

It becomes necessary, when the above-described situations are encountered, to provide a method of determining to which of the central offices, having the same code designation, a call is directed.

It is therefore an object of this invention to obtain type of traffic information from a directory number containing a central office code designation which is common to two separate and distinct central offices.

It is another object of this invention to determine in which of two identically designated central offices a called line is terminated.

The lines served by a single central office may advantageously be divided into more than one rate area. A calling line may, therefore, be charged one rate for a call directed to one group of lines and a different rate for a call directed to a second group of lines within the same central office. These line groups are referred to as a physical office group of numbers and a theoretical office group of numbers. Different central office code designations are assigned to a physical office group and a theoretical office group to enable the switching equipment to distinguish between them for purposes of routing and billing. The marker must be able to compare the central office designation, as requested by the calling line, with the central office designation of the office group, physical or theoretical, to which the called line numerical designation is assigned, to insure that the calling line will be charged properly. Heretofore provision has been made to assign numbers to a physical or theoretical office group sequentially in blocks of one hundred, and facilities were available when verified that a block of one hundred sequential numbers was assigned to either the physical or theoretical central office code. A limitation was therefore placed on the flexibility with which numbers could be assigned to the physical and theoretical offices of a switching center.

It is therefore a further object of this invention to facilitate assignment of any number to either a physical or a theoretical office group of lines by providing means of verifying the assignment of a particular number to a physical or theoretical office group on an individual number basis.

These and other objects of this invention are attained in one specific illustrative embodiment wherein two central offices are assigned the same central office designations. One of these central offices, hereinafter referred to as the local central office, is a crossbar telephone switching system of the type disclosed in the patents of Busch, Busch et al., and Adam et al. supra. The other central office, hereinafter referred to as the remote central office, may comprise any well known type of switching system which will accommodate terminating and outgoing traffic. The aforementioned patents, 2,585,904, 2,535,661 and 2,587,817, are to be considered as incorporated herein by reference to complete the disclosure of elements in the local crossbar office shown in block diagram only in the drawing. It is believed that an understanding of the present invention can best be obtained without consulting a vast amount of circuit details which are not necessary to comprehend the invention but which form a part of the complete crossbar telephone system in which the illustrative embodiment of this invention is incorporated.

For purposes of simplicity it will be assumed that a maximum of 10,000 numbers are served by the combination of these two central offices and that the local office is equipped with a maximum of twenty line link frames. The crossbar system disclosed by Busch provides, in its marker and number group circuits, identification and registration relays for the tens digit and units digit of each line link frame number. Therefore, a central office such as the local central office would require only two frame tens digit identification relays. In accordance with this invention however, the local office number group and marker circuits are equipped to translate and receive equipment location information for sixty line link frames. In other words, there are four extra frame tens digit identification relays provided in the marker. The operation of one of the six frame tens digit identification relays identifies the central office associated with the numerical designation of the called line and also identifies the central office code designation, physical office group or theoretical office group, with which the called line numerical designation is associated.

The local office receives a demand from a local line and proceeds to process the call as described in the Busch patent (column 6, line 40, et seq.). The circuit operations proceed according to the Busch disclosure up to the point of registering the called line central office designation and numerical designation in the marker. Assume this call has been directed to a central office, as indicated by the central office code of the called line directory number, which has the same central office designation as the local office. The marker is now confronted with the problem of determining to which central office, local or remote, the call should be directed. The marker, recognizing this problem, does not operate a route relay directly from the central office code information, as disclosed in Busch, but seizes the number group, primes the number group with the numerical designation of the called line directory number, and receives a translation therefrom indicating, among other information, the tens digit of the line link frame on which the called line is located. The number group circuit is arranged to translate the numerical designation of the called line directory number into a line link frame tens indication which identifies the central office serving the called line. This information also serves to identify the central office code designation, physical or theoretical, with which the numerical designation of the called line directory number is associated.

The marker, upon ascertaining the destination of the call, associates this information with the equipment source that originated the call thereby determining the required type of traffic. If the called line is ascertained to be served by the local central office, the marker again seizes the number group to determine the equipment location of the called line. Thus, three types of information, type of traffic information, equipment location information and information indicating the central office designation with which the numerical designation of a called line directory number is associated, are obtained from two translations of the same numerical designation and rendered by the same number group circuit. However, if the called line is ascertained to be served by the remote central office, the marker proceeds with a normal subscriber outgoing call.

In accordance with a primary feature of this invention a common control circuit, under the control of a called line numerical designation, may seize a translator twice, first to ascertain the type of traffic represented by the numerical designation and second, if indicated necessary by the first translation, to ascertain the equipment location of the called line in the local central office.

In accordance with another feature of this invention a translator serves to translate a called line numerical designation into both the type of traffic represented by the called line and the equipment location of the called line if terminated in the local central office.

It is a further feature of this invention that type of traffic information is obtained by examination and translation of the called line numerical designation as distinguished from the called line central office designation.

It is a still further feature of this invention that the type of traffic information obtained by a translation of the called line numerical designation is checked on an individual number basis to verify the association of the called line numerical designation with the called line central office designation.

Another feature of this invention is the provision of frame identification relays in a common control circuit of a local central office for lines not terminated in the local central office to indicate type of traffic information to the common control circuit when these lines are called.

The above and other objects and features of this invention will be more readily understood from the following description when read with respect to the drawing, in which.

Figures 1A, 6, 7:
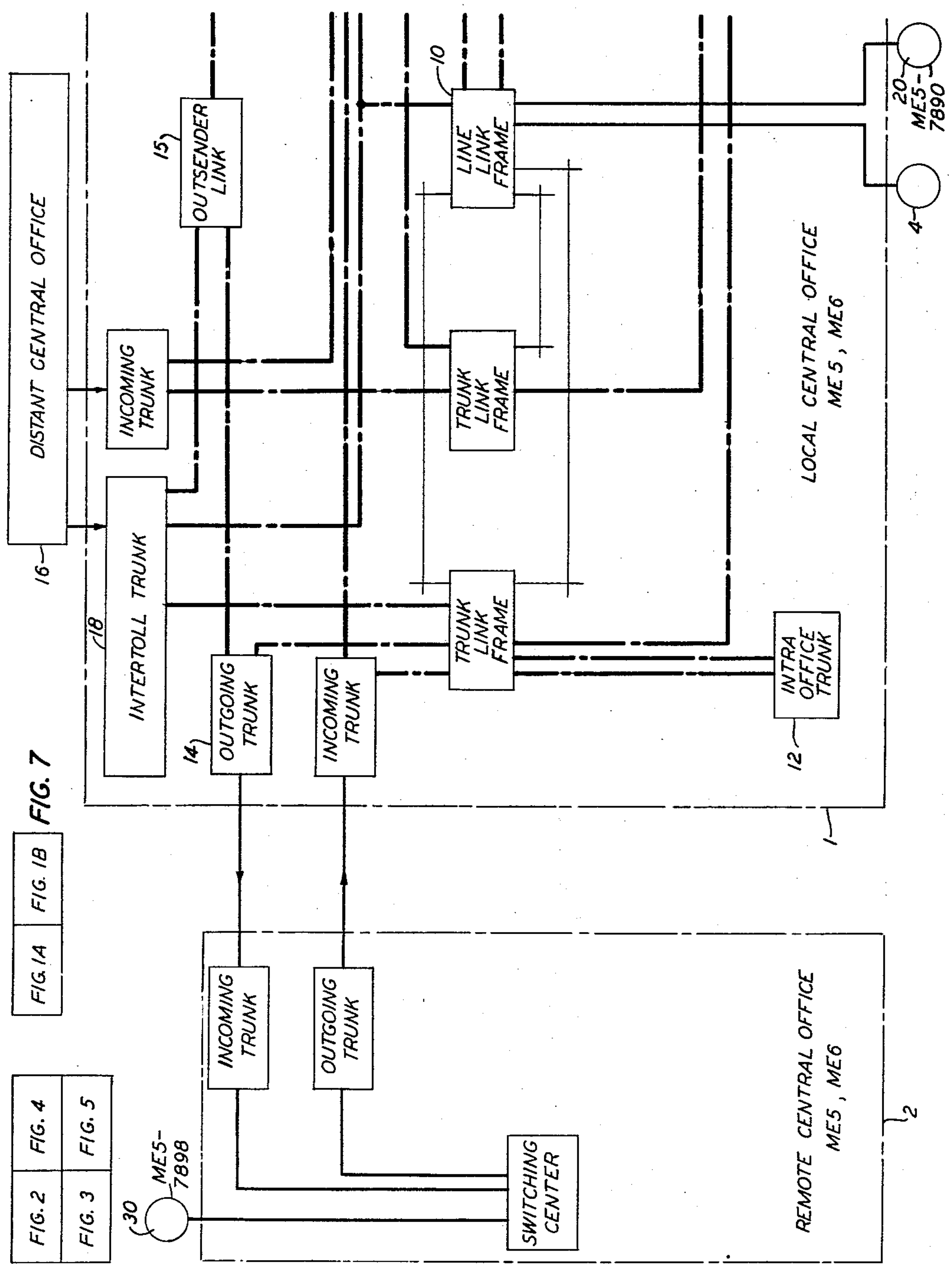
FIGS. 1A and 1B are a block diagram of a crossbar switching system.
FIG. 6 shows the arrangement of FIGS. 2–5.
FIG. 7 shows the arrangement of FIGS. 1A and 1B.
Figure 1B:
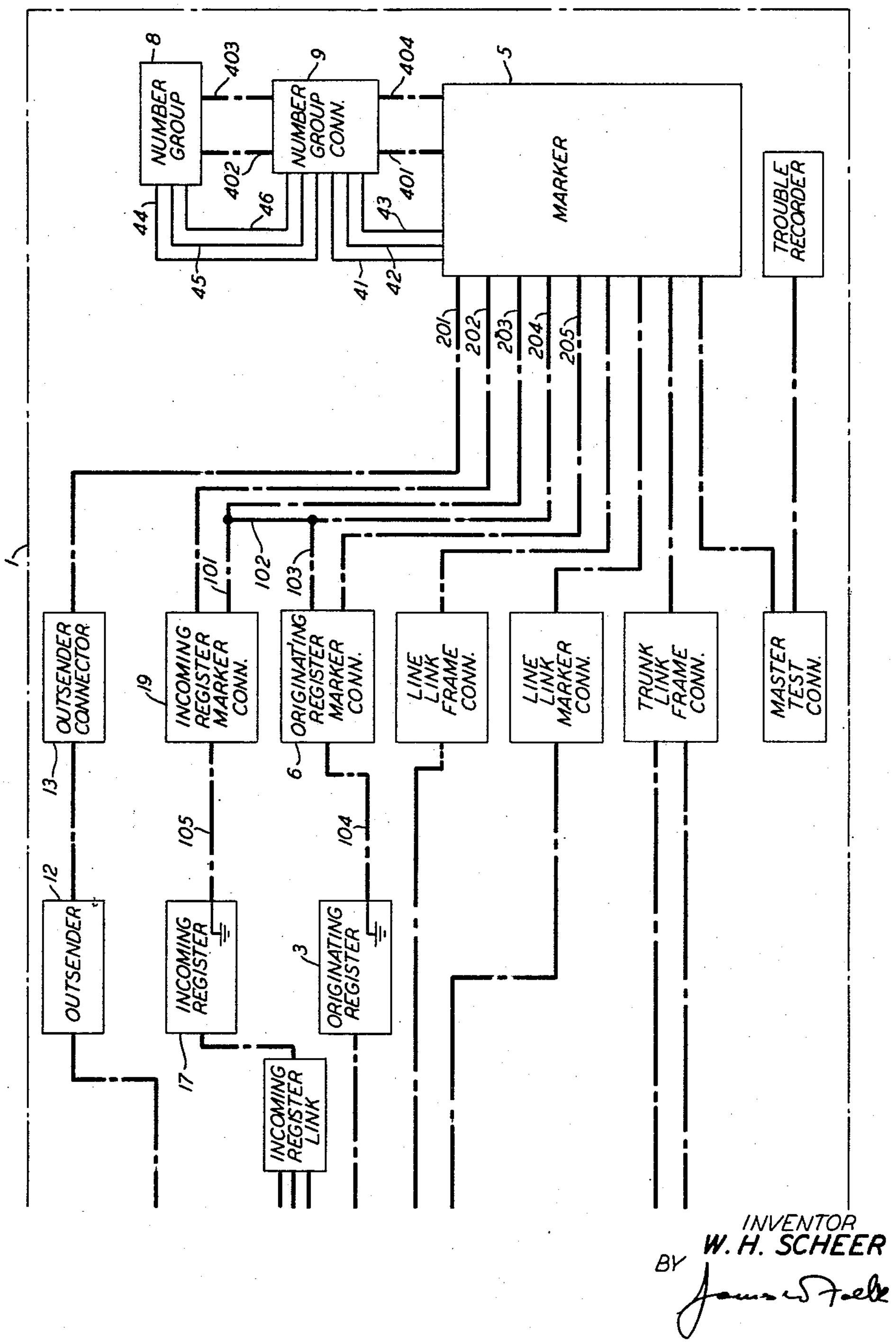

The Busch Patent 2,585,904 supra, describes a crossbar telephone system which is shown in FIGS. 1A and 1B in block diagram form as the local central office 1. The remote central office 2 of FIG. 1A may comprise any well known type of switching system which will accommodate incoming and outgoing trunks. A total of 10,000 lines are served by the combination of the local and remote central offices, 1 and 2. Each line is assigned one of two central office code designations each of which is common to both central offices, and an individual numerical code designation.

The Busch patent describes in detail the circuit operations required to implement the registration of a called line directory number in an originating register 3 responsive to a local line service demand and digit dialing (column 6, line 40, et seq.). These operations, therefore, are not described herein. It is assumed that such a line 4 served by the local central office 1 has dialed the number ME5–7890 and these digits have accordingly been received and stored in the originating register 3 as described by Busch (column 62, line 15, et seq.). The originating register 3, upon completing the registration of the called line directory number, seizes an idle marker 5 through the originating register marker connector 6 and passes the called line directory number to the marker 5 by placing ground on a plurality of leads, represented by cable 104, associated with the called line directory number. The originating register 3 also informs the marker 5 by grounding appropriate leads further represented by cable 104 that this call originated locally and that seven digits are required to identify the called line. The various sources of ground potential which enable these informative leads from the originating register 3 to the marker 5 are not shown in detail but are fully described in the patent to Busch (column 74, line 10, et seq.).

Figure 2:
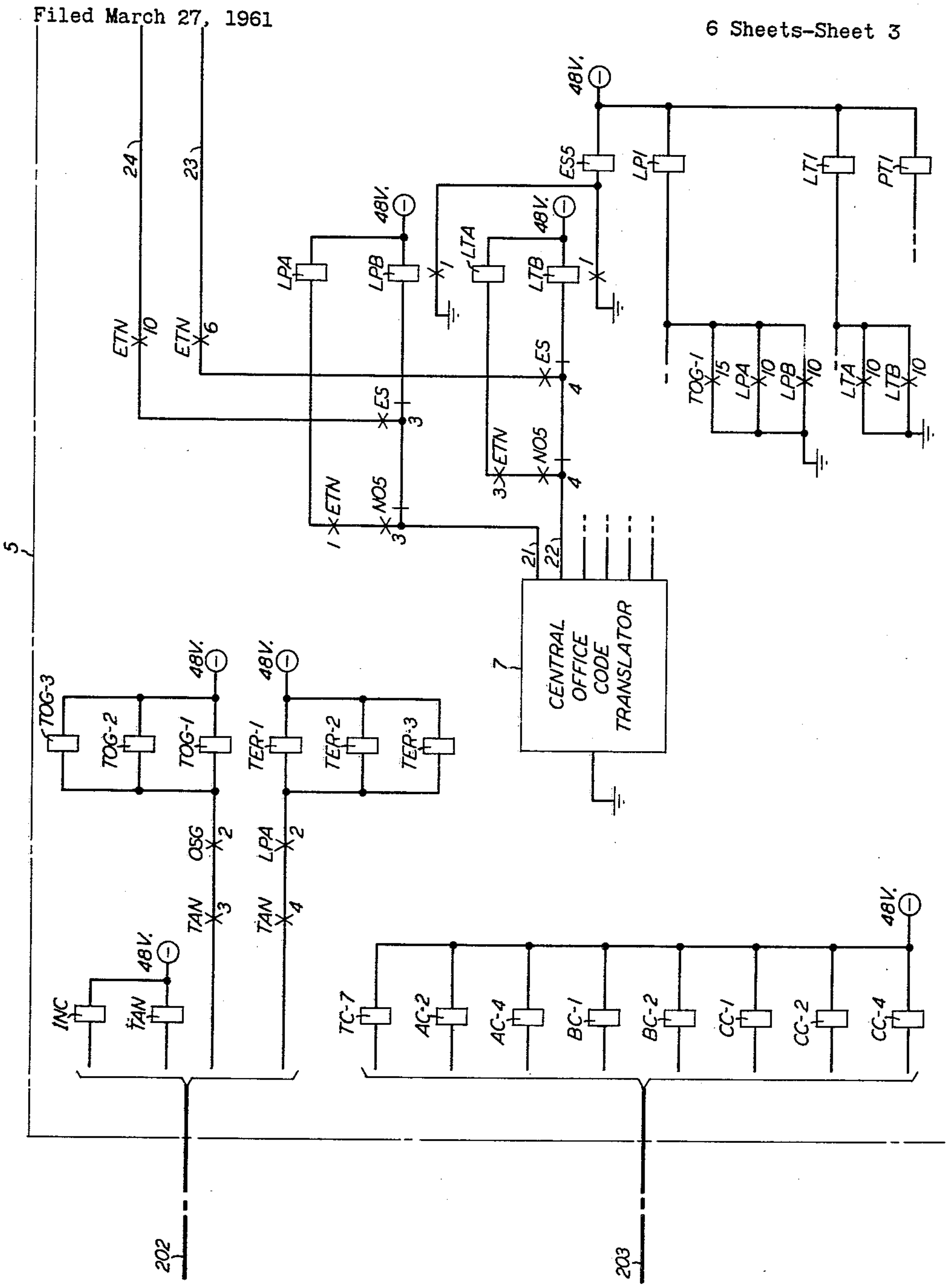
FIGS. 2 through 5 depict an abbreviated, detached contact type schematic representation of the marker circuit of the local central office in accordance with one specific illustrative embodiment of the invention.
Figure 3:
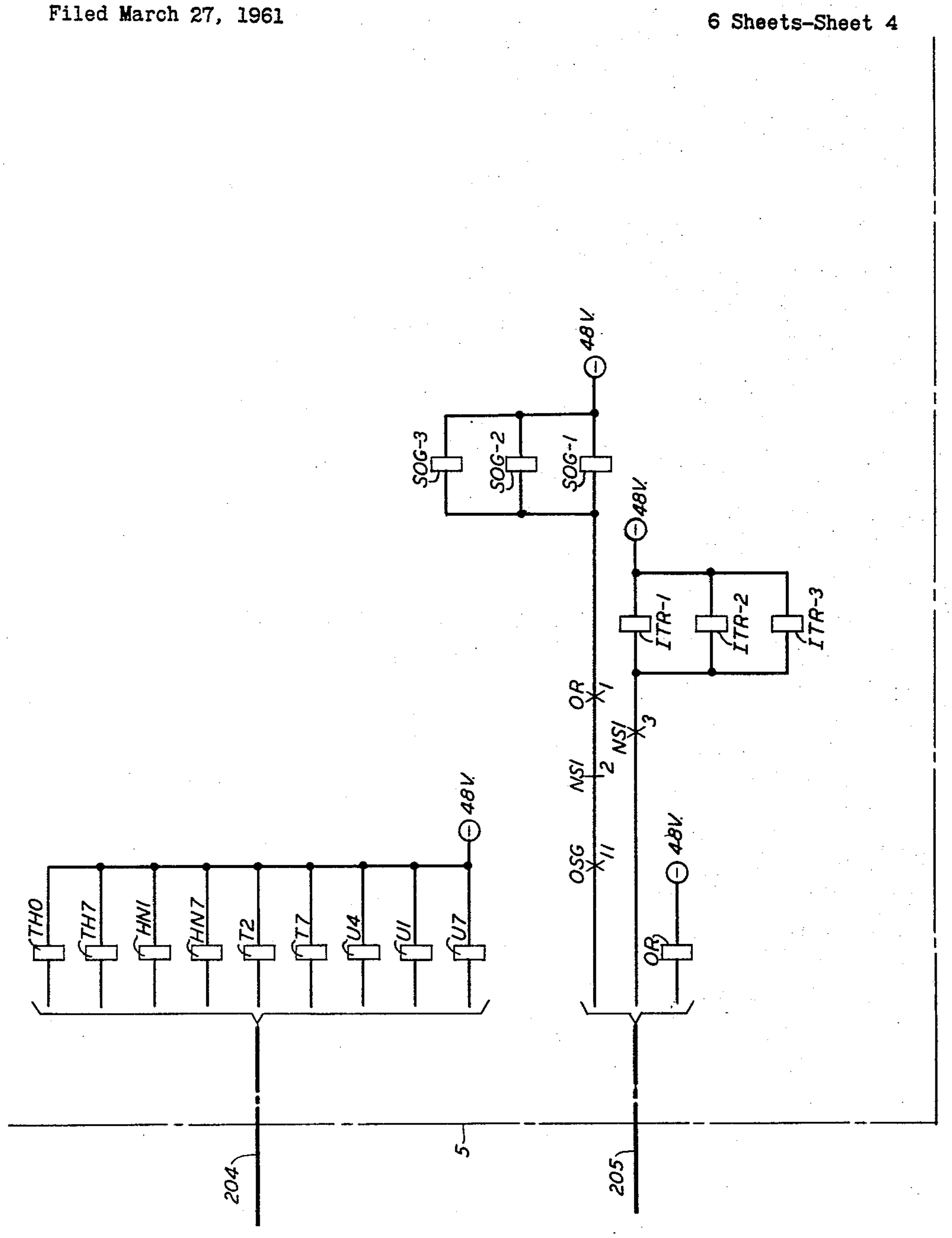

Referring now to FIGS. 2 through 5, which depict in detached contact schematic form some of the relays contained in the marker 5 of the Busch disclosure and certain added relays of this invention, the marker 5 contains called line directory number digit registration relays some of which are shown in FIGS. 2 and 3. The first digit of the called line directory number is registered in the marker 5 through the operation of two of five AC– relays. These relays are designated AC–0, AC–1, AC–2, AC–4 and AC–7 of which AC–2 and AC–4 are shown in FIG. 2. The first digit of the called line directory number ME5–7890 is "M" which corresponds to the digit 6 on a telephone dial. Relays AC–2 and AC–4 are therefore operated in the marker 5 to register the digit 6. The remaining digits of the called line directory number are registered in a similar manner by operating two out of each group of five called line central office designation digit registration relays, BC–0 through BC–7 and CC–0 through CC–7, and two out of each group of five called line numerical designation digit registration relays (FIG. 3), TH–O through TH–7, HN–0 through HN–7, T–0 through T–7, and U–0 through U–7. For illustrative purposes, only those relays which operate to register the called line directory numbers ME5–7890 and ME5–7898 are shown.

The Busch marker 5 also contains registration relays indicating the equipment from which the registered information is obtained such as the INC relay (FIG. 2), denoting an incoming trunk call, relay TAN, denoting an intertoll trunk call and relay OR (FIG. 3) denoting an originating register call.

The marker 5 of the Busch patent contains a translator which translates the called line central office designation, as registered by the called line central office code designation registration relays, and marks a lead unique to the registered central office designation. This translator is shown in FIG. 2 as the central office code translator 7.

The occasion often arises in a particular central office that two groups of lines requiring different charging treatment are served by the same central office. To insure that a call will be charged in accordance with the group to which it is directed the marker must be able to compare the central office designation, as requested by the calling line, with the central office designation of the group, physical or theoretical, to which the called line is assigned. The Busch system provides relays LPA and LTA (FIG. 2) to distinguish between such groups of lines. These groups are accordingly labeled local physical office A and local theoretical office A. The Busch patent also discloses relays LPB and LTB to similarly distinguish between physical and theoretical groups of lines included in a second series of 10,000 numbers when such a second series is required. The Busch marker 5 includes means for comparing central office designations as registered with central office designations as translated in one hundred line blocks as hereinafter described.

In departure from the Busch disclosure this invention provides three additional relays, LP–1, LT–1 and PT–1 (FIG. 2); relay LP–1 denoting a physical central office designation registered by the marker 5 in its called line directory number registration relays, relay LT–1 denoting a registered theoretical central office designation and relay PT–1 denoting a registered central office designation which requires no rate discrimination treatment and which is served only by the local central office 1 (FIGS. 1A and 1B). These relays are used to insure that the central office designation registered in the marker matches the central office designation of the group of lines, physical or theoretical, to which the numerical designation of the called line directory number is assigned, thereby insuring that the calling line is properly charged for the call. If the registered central office designation is not the same as the central office designation of the group of lines to which the registered numerical designation is assigned, a no-match condition is detected as will be described.

The LPB relay and LTB relay (FIG. 2) are utilized in this invention merely to inform the marker 5, through the operation of relays LP–1 or LT–1 respectively, of the physical or theoretical group association of the registered central office designation and to operate relay ES–5 (FIG. 2). Relay ES–5 has been added to the Busch marker 5 to indicate the necessity of determining to which central office, local 1 or remote 2, a call is directed.

Seize-number-group relays SNG–1 and SNG–2 (FIG. 4) are included in the Busch disclosure. The operation of these relays, as hereinafter described, enables the seizure of the number group 8 by the marker 5.

Figure 4:
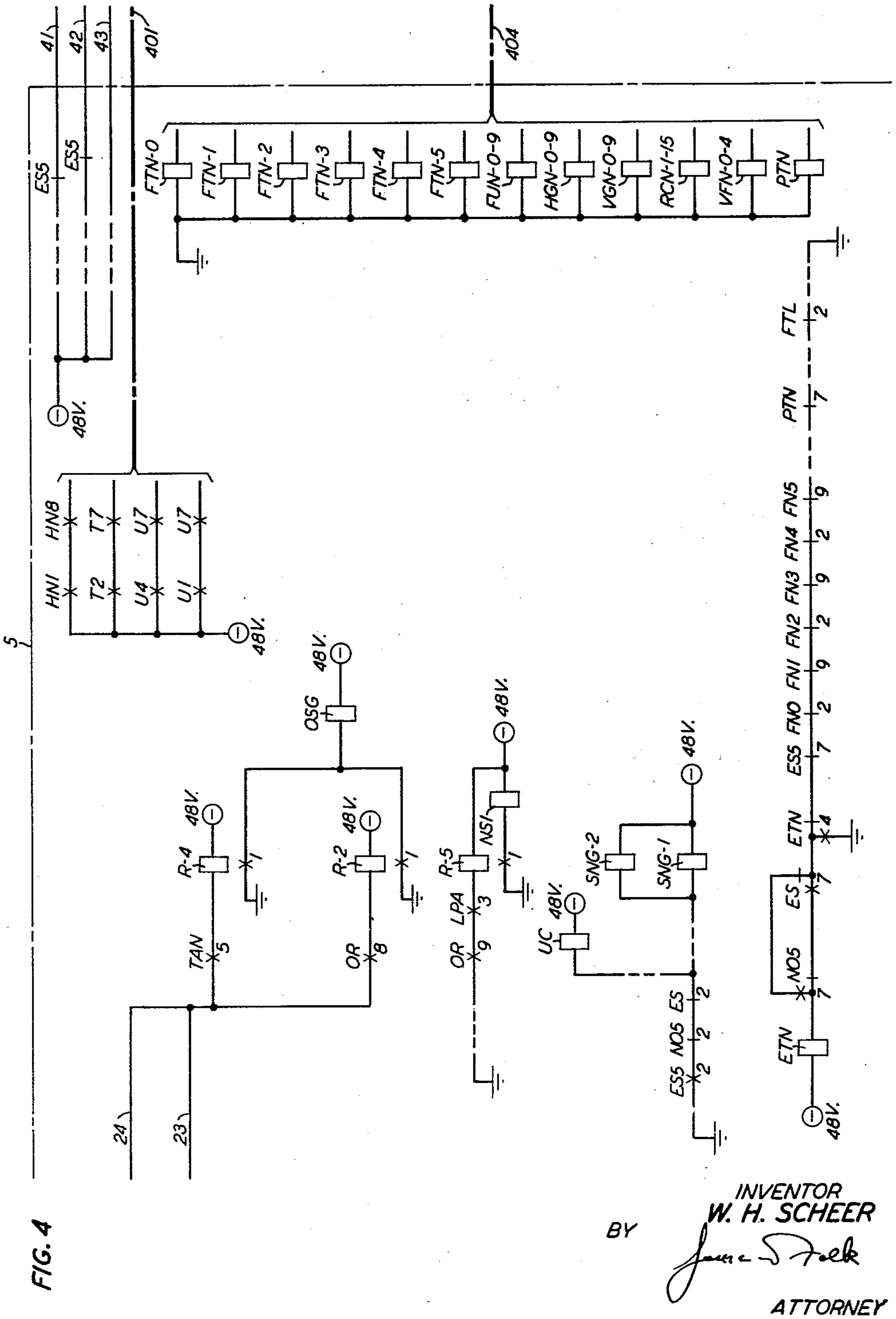

The Busch marker 5 contains relays utilized for receipt of a called line equipment location such as FTN– relays, FUN– relays, HGN– relays, VGN– relays, RCN– relays and VFN–relays. These relays are shown in FIG. 4. However, only the FTN–0 through FTN–5 relays are completely disclosed; the remaining relays being shown as single windings representing a plurality of corresponding windings numbered as indicated. Also contained in the marker 5 of the Busch patent are called line equipment location registration relays such as FN–0 through FN–5 shown in FIG. 5. The remaining called line equipment location registration relays are not shown but generally correspond to the equipment location receiving relays and serve to register the information received by them.

In the Busch system numbers are assigned to a physical or theoretical office group sequentially and in blocks of one hundred. The number group 8 of the Busch system is arranged to translate the numerical designation of a called line directory number and operate a relay in the marker indicating either a physical number, a theoretical number or a number requiring no rate discrimination treatment. Busch provides relay PTN (FIG. 4) for those numbers requiring no rate discrimination. As will be hereinafter described, this invention provides a physical or theoretical number indication on an individual number basis thereby eliminating the necessity for a physical or theoretical indication on a one hundred number block basis.

In further departure from the Busch patent relays NO–5 and ES (FIG. 5) are provided in this invention to indicate to the marker 5 to which central office, local 1 or remote 2, respectively, a call is directed. One of these relays is operated in response to a number group translation of the called line numerical designation; this translation having been initiated by relay ES–5. Another additional relay, ETN (FIG. 4), is provided by this invention to indicate a successful end of translation and to verify release of the number group 8 to the marker 5.

The Busch disclosure describes route relays such as R–2 and R–4 (FIG. 4) and class of call relays such as tandem outgoing, TOG–1, TOG–2 and TOG–3, subscriber outgoing, SOG–1, SOG–2 and SOG–3, intraoffice, ITR–1, ITR–2 and ITR–3, and terminating, TER–1, TER–2 and TER–3, which may be seen in FIGS. 2 and 3.

In brief description, a called line directory number or address code is assumed to be registered in the marker 5. Upon translation of the registered central office designation by the central office code translator 7, relay LPB or relay LTB is operated, thereby operating relay ES–5 and one of relays LP–1, LT–1 or PT–1. The marker 5, now informed that a type of traffic translation of the registered called line numerical code designation is required, operates relays SNG–1, SNG–2 and UC causing the seizure of the number group 8. The number group 8 is primed by the marker 5 with the numerical designation of the registered directory number and returns a frame tens digit indication to the marker 5, thereby operating either relay NO-5 or relay ES. The operation of one of these relays indicates to the marker to which central office, local 1 or remote 2, the call is directed. To operate either relay NO-5 or relay ES the registered central office designation, as indicated by relays LP-1 or LT-1, must match the central office designation of the group, physical or theoretical, associated with the called line numerical designation, as indicated by the number group translation. Absence of this match is detected by the no-match indicator 50. The number group 8 is released by the marker 5 upon the operation of relay ES or relay NO-5 thereby releasing the equipment location registration relays and operating end-of-translation relay ETN. If the call is directed to the local central office 1 relay LPA or relay LTA will now operate thereby directing the marker 5 to handle the call as local terminating traffic. If the call is directed to the remote central office 2 a route relay, R-2 or R-4 (FIG. 4), is operated thereby directing the marker 5 to complete the call as outgoing traffic.

DETAILED DESCRIPTION

The called line central office designation, ME5, is assumed to be received and registered by the marker 5 on a two-out-of-five basis through the operation of relays AC-2 and AC-4, BC-1 and BC-2, and CC-1 and CC-4 as described above. The operation of the TC-7 relay informs the marker 5 that it must register seven digits to identify the called line. The operating circuits for these relays are fully described in Busch supra, and, therefore, will not be shown in detail herein. However, they may be partially traced from battery through the winding of each respective registration relay (FIG. 2) over cables 203, 102, and 103 (FIG. 1B) through the originating register marker connector 6, and over cable 104 to ground in the originating register 3. The operation of relay OR (FIG. 3) indicates to the marker 5 that the call originated in the local office 1 and its operating circuit may be partially traced from battery through the winding of the OR relay over cable 205 (FIG. 1B) through the originating register marker connector 6 and over cable 104 to ground in the originating register 3.

The called line central office designation is now translated by the central office code translator 7 which places ground on lead 21, one of a plurality of leads each of which is individually associated with various central office designations; lead 21 being discretely associated with the called line central office designation ME5. This translation is fully described in the patent to Busch (column 74, line 51, et seq.) and is not herein detailed. The enabling of lead 21 causes the operation of relay LPB whose operating circuit may be traced from battery through its winding, break contact 3 of relay ES, break contact 3 of relay NO-5, over conductor 21, through the central office code translator 7 to ground. Relay LTB is provided for those central offices requiring a theoretical central office designation such as ME6 to distinguish between charging rates of different groups of subscribers served by the local central office 1 and, although not described in detail, relay LTB fnuctions in a similar manner to the LPB relay when such a theoretical central office designation is required. The operation of relay LPB establishes an obvious circuit to operate the ES-5 relay.

Relay ES-5, in operating, informs the marker 5 that the called line central office designation ME5 represents a line which may be served by either the local central office 1 or the remote central office 2. The marker 5 must, therefore. determine to which central office the call is directed. Normally, as described in Busch (column 75, line 33, et seq.), the operation of the LPB relay would be sufficient to identify the desired terminating office and would directly operate an appropriate route relay. However, due to the identity of the central office designations of the local and remote central offices, 1 and 2, the marker 5 must determine the proper type of traffic from information other than the central office designation ME5.

INTRAOFFICE CALL

It is assumed that the line 20 (FIG. 1) represented by the called line directly number ME5-7890 is served by the local central office 1. The call, therefore, represents an intraoffice type of traffic. The determine this information the marker 5 causes the called line numerical designation to be translated by the number group 8 into the type of traffic represented by the call.

The passage of the called line numerical designation to the marker 5 and its registration therein is discussed in detail in the Busch patent (column 75, line 61, et seq.) and, as such, will not be described herein. It is believed sufficient to say that relay LPB, in operating, prepares the marker 5 to receive and register the digits of the called line numerical designation. These digits 7, 8, 9 and 0, are registered in the marker 5 on a two-out-of-five basis through the operation of relays TH-0 and TH-7, HN-1 and HN-7, T-2 and T-7, and U-4 and U-7 (FIG. 3) in a manner similar to the above-described operation of the central office code designation registration relays. An abbreviated and partial circuit for operating these relays may be traced from battery through their respective windings, over cables 204 and 103, (FIG. 1B) through the originating register marker connector 6 and over cable 104 to ground in the originating register 3.

Relay LPB, in operating, also establishes a circuit which directly operates the LP-1 checking relay (FIG. 2), the function of which is hereinafter described.

The operation of relay ES-5, having informed the marker 5 that the called line numerical designation must be translated to ascertain the required type of traffic, initiates the seizure of the number group 8 by establishing a circuit to operate relays SNG-1, SNG-2 and UC (FIG. 4). This circuit may be partially traced from battery through the windings of the respective relays, break contact 2 of relay ES, break contact 2 of relay NO-5, and make contact 2 of relay ES-5 to ground. The seizure of the appropriate number group 8, its operations in translating the called line numerical designation into the equipment location of the called line and the return and registration of this information in the marker 5 is disclosed in detail in Busch (column 81, line 13, et seq.) and, therefore, a full description of these operations is not considered necessary to this disclosure. However, in general, the marker 5 translates the two-out-of-five registration of the called line numerical designation into four one-out-of-ten digit indications. The thousands digit indication is used to control the selection and seizure of the proper number group 8. The marker 5 then places battery (FIG. 4) on a plurality of leads associated with the called line numerical designation as illustrated by cable 401, the enablement of which actuates a relay tree translator (not shown) in the number group 8 thereby marking one set of three terminals (not shown) which are discrete to the called line numerical designation 7890. This marking is accomplished by extending battery to these three terminals from the marker 5 (FIG. 4) over leads 41, 42, and 43, (FIG. 1B), through the number group connector 9 and over leads 44, 45, and 46 to the number group. Each of the three marked terminals is associated with a translator cross-connection field, and each such field provides two of the six indications required to identify the equipment location of the called line 20 and the type of ringing required by the called line 20. This information is returned to the marker 5 over cable 403 (FIG. 1B) through the number group connector 9, over cable 404 and registered in the marker 5 (FIG. 4) through the operation of one of six FTN- relays, one of ten FUN- relays, one of ten HGN- relays, one of ten VGN– relays, one of five VFN– relays, and one of fifteen RCN– relays.

The local central office 1 is assumed to contain a maximum of twenty line link frames. In a normal situation this number of frames would require only two relays to indicate the appropriate tens digit of the number of the line link frame in which the called line terminates. However, six such relays, FTN–0 through FTN–5, have been provided. The number group 8 has also been arranged to return six possible frame tens digit indications by providing sixty terminals (not shown) in the appropriate translator cross-connection field. Details of the number group circuit translation fields may be found in Busch (column 84, line 8, et seq.) and are not shown herein. The number group translation field which provides the number of the line link frame containing the called line is arranged to return frame number tens digit indications as indicated in the following table.

*Table I*

| Number Assigned to Central Office Code | Line Served By— | Frame Tens Location | Cross Connect Number Group to Return— |
|---|---|---|---|
| ME5 | Local C. O. | 0 | FTN–0 |
| ME5 | Local C. O. | 1 | FTN–1 |
| ME6 | Local C. O. | 0 | FTN–2 |
| ME6 | Local C. O. | 1 | FTN–3 |
| ME5 | Remote C. O. | | FTN–4 |
| ME6 | Remote C. O. | | FTN–5 |

Relays FTN–2, FTN–3 and FTN–5 are provided for those central offices having both a physical and a theoretical central office designation, such as ME5 and ME6, respectively, and function in a similar manner to relays FTN–0, FTN–1, and FTN–4, as hereinafter described.

A number group translation indicating the destination of the call and the central office designation to which a numerical designation is assigned requires the operation of only an FTN– relay, as can be seen from the above Table I. Relay ES–5 whose operation has been described, therefore disables leads 41 and 42 (FIG. 4) which provide operating circuits for an HGN– relay, a VGN– relay, a VFN– relay, and an RCN– relay, which information is superfluous for a type of traffic translation.

Again referring to the above Table I, it may be seen that the called line numerical designation, 7890, will be translated by the number group 8 into information indicating that the called line 20 is located in one of the first ten line link frames. Therefore, relay FTN–0 is operated over a circuit which may be traced from battery (FIG. 4) over lead 43 (FIG. 1) through the number group connector 9, over lead 46, through the number group 8, over cable 403, through the number group connector 9, over cable 404 and through the winding of relay FTN–0 (FIG. 4) to ground.

Relay PTN operates in the marker 5 to indicate that no distinction between physical and theoretical central office designations is required on a one hundred line block basis. The operating circuit for the PTN relay is not shown but is described fully in the Busch patent (column 83, line 18, et seq.). Relay FTN–0 in operating establishes an obvious circuit which operates the FN–0 relay. The operation of the PTN relay provides an obvious circuit which operates relay PTK.

Relays LP–1, LT–1, and PT–1 (FIG. 2) are provided as checking relays for those central offices which require a physical and theoretical central office designation to distinguish between charging rates for different groups of subscribers. Relay LP–1 was operated, as described above, since the called line central office designation, ME5, represented a physical number. Had the call been directed to a theoretical central office designation, such as ME6, relay LTB would have been operated over lead 22 in a manner similar to the above-described operation of relay LPB over lead 21. The operation of relay LTB would have operated relay LT–1 over an obvious circuit. Relay PT–1 is provided for incoming calls directed only to the local central office 1 and which do not require rate discrimination. Relay PT–1 is operated regardless of physical or theoretical central office code designation for such calls.

The translation, checking and registration circuitry (FIG. 5) is arranged to provide information to the marker in accordance with the following table.

*Table II*

| Checking Relay Operated | Number Group Translation | Marker Information |
|---|---|---|
| LP–1 | FTN–0<br>FTN–1 | Line in local C.O. |
| | FTN–4<br>FTN–2 | Line in Remote C.O. |
| | FTN–3<br>FTN–5 | No-Match. |
| LT–1 | FTN–2<br>FTN–3 | Line in local C.O. |
| | FTN–5<br>FTN–0 | Line in Remote C.O. |
| | FTN–1<br>FTN–4 | No-Match. |
| PT–Z | FTN–0<br>FTN–1<br>FTN–2<br>FTN–3 | Line in local C.O. |
| | FTN–4<br>FTN–5 | No-Match. |

Figure 5:
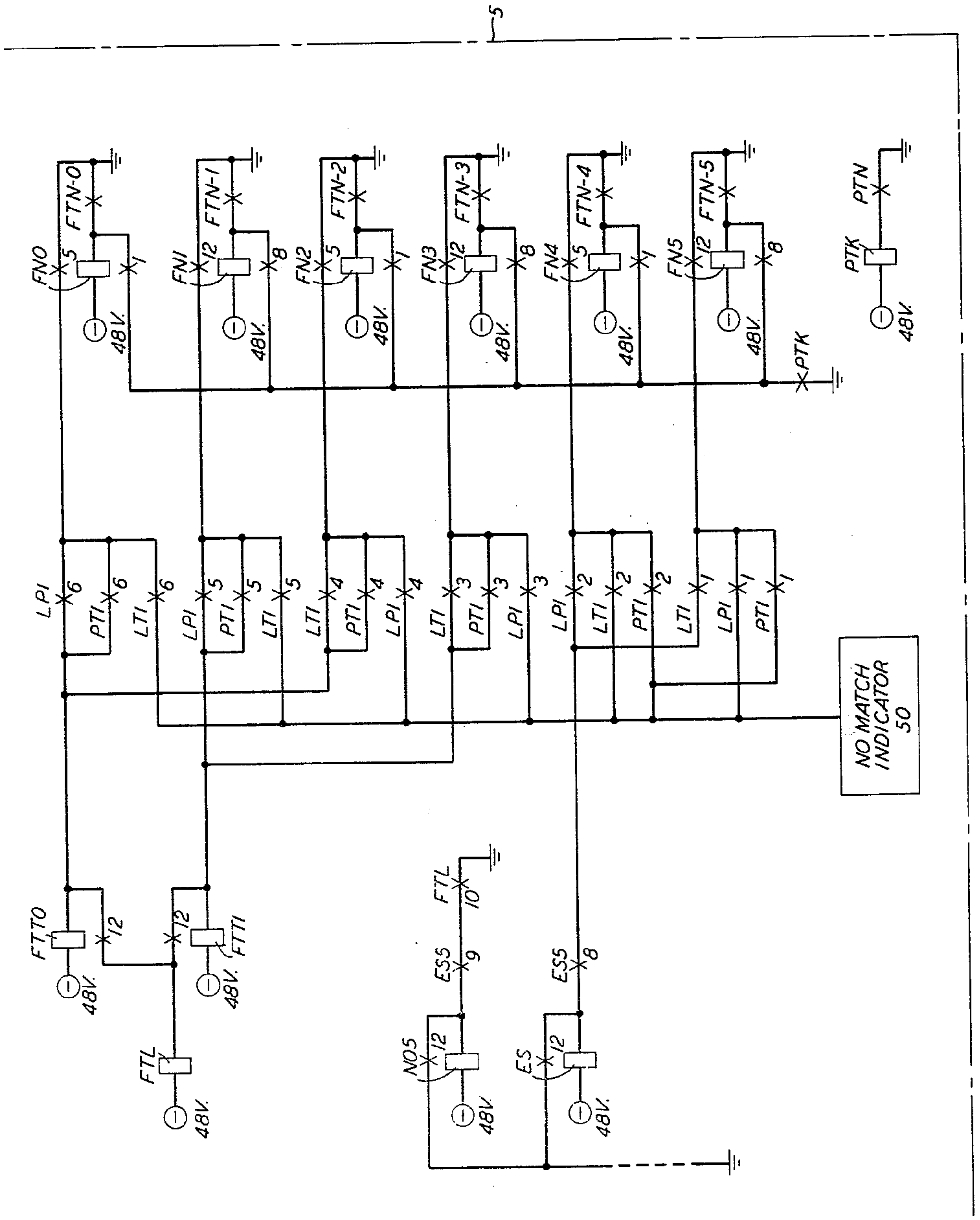

The rate discrimination information provided by the called line central office designation as registered in the marker 5 is matched, as shown in the above Table II, on an individual line basis with the translation of the called line numerical designation thereby checking that the numerical designation is assigned to the registered central office designation. If the called line numerical designation is not associated with the called line central office designation, as registered in the marker 5, a failure-to-match indication is detected by the no-match indicator 50 (FIG. 5). Heretofore such rate discrimination checking has been available only for blocks of one hundred sequentially numbered lines as described in the Busch patent (column 83, line 6, et seq.).

Relay FN–0 (FIG. 4), in operating, extends ground through its make contact 5, make contact 6 of relay LP–1, and the winding of relay FTT–0 to battery, thereby operating the FTT–0 relay. Relay FTL is now operated over a circuit extending the operating ground for the FTT–0 relay through make contact 12 of the FTT–0 relay, and through the winding of relay FTL to battery. Relay FTL, in operating, extends ground through its make contact 10, make contact 9 of previously operated relay ES–5 and the winding of relay NO–5 to battery, thereby operating relay NO–5. The operation of relay NO–5 informs the marker 5 that the called line 20 is served by the local central office 1.

Relay LPB (FIG. 2) is now released by the opening of break contact 3 of relay NO–5. The release of relay LPB releases relays ES–5, SNG–1, SNG–2, and UC, thereby releasing the number group 8. The number group release is not described herein, however, a detailed description of this operation is included in the patent to Busch (column 86, line 74, et seq.).

The release of the number group 8 prepares a circuit for the operation of relay ETN (FIG. 4), whose operation will inform the marker 5 that the type of traffic translation is completed. The operating circuit of relay ETN may be partially traced from battery through the winding of relay ETN, make contact 7 of relay NO–5, break contact 7 of relay ES, break contact 7 of relay ES–5, break contact 2 of relay FN–0, break contact 9 of relay FN–1, break contact 2 of relay FN–2, break contact 9 of relay FN–3, break contact 2 of relay FN–4, break contact 9 of relay FN–5, break contact 7 of relay PTN, break contact 2 of relay FTL and through a number of break contacts of other registration relays (not shown) which released when the number group 8 was released. Relay ETN serves as a check that a translation has been received, the number group 8 is released and all equipment location registration and associated relays are released.

The operation of relay ETN completes a circuit for the operation of relay LPA (FIG. 2). This circuit extends from battery through the winding of relay LPA, make contact 1 of relay ETN, make contact 3 of previously operated relay NO–5, over conductor 21 and through the central office code translator 7 to ground.

The circuit operations following the operation of the LPA relay are described in detail in the Busch patent (column 75, line 33, et seq.) and are to be considered as included herein by reference. Briefly, relay LPA, in operating, establishes an operating circuit for route relay R–5 (FIG. 4). This circuit extends from battery through the winding of route relay R–5, through make contact 3 of relay LPA and make contact 9 of previously operated relay OR to ground. The operation of route relay R–5 causes relay NSI to operate through an obvious circuit. Relay NSI, in operating, completes a circuit for operating class relays ITR–1, ITR–2, and ITR–3 (FIG. 3). This circuit may be partially traced from battery through the winding of relays ITR–1, ITR–2, and ITR–3, respectively, through make contact 3 of relay NSI, over cable 205 (FIG. 1B), through the originating register marker connector 6 and over cable 104 to ground in the originating register 3.

The marker 5 now proceeds with the completion of an intraoffice call. The operation of relay LPA established the destination of the call; the operation of relay OR established the location of call origination; and the combining of this information informed the marker 5 that an intraoffice type of traffic was required to complete the call.

It will be noted, by referring to Busch (column 80, line 67, et seq.) that the number group 8 must be seized by the marker 5 to translate the called line numerical designation into the equipment location of the called line 20. Relay LPA, in operating, again operates relay LP–1 (FIG. 2) thereby providing an individual number translation check as described above. Relay ES–5, whose release was hereinbefore described, is in a nonoperated condition thus enabling all three battery leads 41, 42 and 43 (FIG. 4) from the marker 5 (FIG. 1) to the number group 8 and allowing a complete equipment location translation to be made and passed to the marker 5.

Upon receipt of the equipment location, the marker 5 proceeds to seize the proper line link frame 10 and establish the desired connection between the calling and called lines, 4 and 20 respectively, by means of an intraoffice trunk 11 as described in the Busch patent (column 87, line 5, et seq.).

OUTGOING CALL

The calling line 4 (FIG. 1B), instead of desiring a connection to a line 20 served by the local central office 1, may desire connection to a line 30 (FIG. 1A) served by the remote central office 2. Such a line 30 may be represented by the directory number ME5–7898. If this number is dialed, the call will proceed as described for the above intraoffice call with the exception that relay U–1 (FIG. 3) will be operated in the marker 5 to indicate the units digit of the called line directory number rather than the U–4 relay as above.

The marker 5 again is informed that a preliminary type of traffic translation must be obtained from the number group 8 before the call may be properly handled, as hereinbefore described. The number group 8 is arranged to return a line link frame number tens digit of four for physical numbers served by the remote central office 2, as seen in Table No. I, supra, thereby operating the FTN–4 relay. Relay FTN–4 operates, responsive to the application of the numerical designation 7898 to the number group 8, in a manner similar to the operation of the FTN–0 relay in response to the application of numerical designation 7890 to the number group 8, as described for the intraoffice call above. Relays LPB, LP–1 and ES–5 have been operated, as previously described, and the operation of relay FTN–4 completes an obvious circuit for the operation of relay FN–4 (FIG. 5). Relay FN–4, in operating, completes the operating circuit for relay ES. This circuit extends from ground, through make contact 5 of relay FN–4, make contact 2 of relay LP–1, make contact 8 of relay ES–5 and through the winding of relay ES to battery. The operation of the ES relay indicates to the marker 5 that the called line 30 (FIG. 1) is served by the remote central office 2.

The number group 8 is now released by the release of relay LPB as previously described. Relay ETN (FIG. 4) is operated, as above, to indicate that the equipment location and associated relays have been released, a translation has been registered and the number group 8 is released. This operating circuit may be partially traced from battery through the winding of relay ETN, break contact 7 of relay NO–5, make contact 7 of relay ES, and through a plurality of break contacts of register relays, hereinbefore described, to ground.

The operation of relay ETN, in combination with previously operated relay ES, extends ground from lead 21 over lead 24 (FIG. 2), through make contact 8 of previously operated relay OR, through the winding of route relay R–2 (FIG. 4) to battery, thereby operating route relay R–2. Relay R–2, in operating, closes an obvious circuit operating relay OSG. The outgoing class relays, SOG–1, SOG–2, and SOG–3 (FIG. 3), are now operated to inform the marker 5 that the call is not directed to the local central office 1 and must be handled as outgoing. Relays SOG–1, SOG–2, and SOG–3 are operated over a circuit extending from battery through their respective windings make contact 1 of relay OR, break contact 2 of relay NSI, make contact 11 of relay OSG, over cable 205 (FIG. 1B), through the originating register marker connector 6 and over cable 104 to ground in the originating register 3.

The succeeding circuit operations for completing an outgoing call are detailed in the Busch patent (column 108, line 1, et seq.) and will not be discussed herein. However, it may be noted, by referring to Busch, supra, that the number group 8 is not normally seized in completing an outgoing call since the called line 30 does not have an equipment location in the local central office 1. Briefly, the marker 5 selects an outsender 12 (FIG. 1B) through the outsender connector 13 and connects the outsender 12 to a selected outgoing trunk 14 (FIG. 1A) through the outsender link 15. The called line directory number is then transmitted by the outsender 12 to the remote central office 2. The marker 5 causes the establishment of a connection between the calling line 4 and the outgoing trunk 14 and then releases control of the call.

TANDEM CALLS

A call received over an intertoll trunk 18 (FIG. 1A) from a distant central office 16 to the local central office 1 may be directed to a called line served by either of the identically designated local or remote central offices 1 and 2. It again becomes necessary, in such a situation, for the local central office 1 to determine to which central office the call is directed, i.e., is a terminating or tandem type of traffic required?

Patent 2,587,817 to Busch, et al., which has been included herein by reference, discloses the switching circuitry and its operation required to accommodate a tandem type of traffic.

The called line directory number is registered in the incoming register 17 (FIG. 1B) and passed to the marker 5 as described in Busch, et al. (column 2, line 29, et seq.). The marker 5 is informed that an intertoll trunk 18 (FIG. 1A) has received the call in the local central office 1 by the operation of relay TAN (FIG. 2) in the marker 5. The TAN relay operates from battery through its winding, over cable 202 (FIG. 1B) through the incoming register marker connecter 19 and over cable 105 to ground in the incoming register 17. The operating circuit for the central office code registration relays, AC–2 and AC–4, BC–1 and BC–2 and CC–1 and CC–4, may be partially traced from battery through the windings of each relay (FIG. 2) over cables 203, and 101 (FIG. 1B), through the incoming register marker connector 19 and over cable 105 to ground in the incoming register 17. As in the case of the originating register 6, the enablement and application of ground to the various indicating leads from the incoming reigster 17 to the marker 5 is not detailed herein, but is fully described in the patent to Busch, et al. (column 19, line 51, et seq.).

The translation of the central office designation, the indication of a type of traffic translation requirement, the seizure of the number group 8, the receipt and registration of the type of traffic translation by the marker 5 and the operation of either the NO–5 relay for a line served by the local central office 1, or the ES relay for a line served by the remote central office 2, occur exactly as hereinbefore described for the intraoffice type of call. The marker 5, therefore, has determined the destination of the call. To determine the required type of traffic the marker 5 associates the source of the call, which is the intertoll trunk 18, with the destination of the call.

TANDEM-TERMINATING CALL

If the called line is served by the local central office 1 as is line 20 (FIG. 1B), relay NO–5 has been operated, as previously described. Relay NO–5, in operating established a circuit which operated relay LPA. The operation of relay LPA, in combination with the previously operated TAN relay, provides a circuit (FIG. 1B) extending from ground in the incoming register 17, over cable 105, through the incoming register marker connector 19, over cable 202, through make contact 4 of relay TAN (FIG. 2), make contact 2 of relay LPA and through the windings of relays TER–1, TER–2, and TER–3 to battery, thereby operating relays TER–1, TER–2, and TER–3.

The operation of relays TER–1, TER–2, and TER–3 and relay LPA directs the marker 5 to handle the call as one which terminates locally, as fully described in the patent to Busch et al. (column 31, line 29, et seq.). In handling such a local call the number group 8 is used, as in the case of the above-described intraoffice call, to determine the equipment location of the called line 20 in the local central office 1 and to verify the assignment of the called line numerical designation to the dialed central office designation. The marker 5, utilizing this translation, establishes a connection between the trunk link frame appearance of the intertoll trunk 18 and the line link frame appearance of the called line 20.

TANDEM-OUTGOING CALL

If the called line is served by the remote central office 2, as is line 30 (FIG. 1A), relay ES has been operated, as hereinbefore described for the subscriber outgoing type of call. Relay ES, in operating, transferred the ground on lead 21 (FIG. 2) from the winding of relay LPB to lead 24, as previousy described, thereby establishing a circuit to operate route relay R–4 (FIG. 4). This circuit may be traced from battery, through the winding of relay R–4, make contact 5 of relay TAN, over lead 24, through make contact 10 of relay ETN (FIG. 2), make contact 3 of the relay ES, over lead 21 and through the central office code translator 7 to ground.

The circuit operations involved in establishing a tandem outgoing call are fully described in the patent to Busch et al. (column 21, line 41, et seq.) and are not herein fully discussed. Briefly, the marker 5 seizes the number group 8 (FIG. 1B) to determine the line link frame location of the intertoll trunk 18 (FIG. 1A), establishes a connection between the line link frame appearance of the intertoll trunk 18 and the trunk link frame appearance of the outgoing trunk 14, connects an outsender 12 to the outgoing trunk 14 and releases.

Although a particular circuit arrangement has been described herein by way of example of the utility of the present invention, the scope of this invention is not to be considered limited to such embodiment. Variations of the circuits, order of operation thereof and details of operation thereof are possible within the scope of the instant invention. Numerous other arrangements and applications may be devised by those skilled in the art without departing from the spirit and scope of the invention.

What is claimed is:

1. An automatic switching system having a plurality of lines identifiable by address codes, each of said codes comprising a central office designation and an individual line numerical designation, said system comprising a switching center having apparatus terminations for local terminating traffic and apparatus terminations for other traffic, register means for registering a line numerical designation, a translator, first means including said translator for ascertaining information defining the type of traffic represented by a registered line numerical designation, and second means including said translator and responsive to said first means for ascertaining information defining the apparatus termination location corresponding to a registered line numerical designation previously ascertained to represent local terminating traffic.

2. A crossbar telephone switching system having a plurality of lines identifiable by address codes, each of said codes comprising a central office designation and an individual line numerical designation; said system comprising a crossbar switching center comprising line switches having apparatus terminations thereon for local terminating traffic, trunk switcher having apparatus terminations thereon for traffic other than local terminating traffic, a register for registering a line numerical designation, a marker, a number group translator circuit, first means in said marker cooperative with said number group circuit and responsive to said register for ascertaining information defining the type of traffic represented by a registered numerical designation, second means in said marker cooperative with said number group circuit and responsive to said first means and to said register for ascertaining information defining the location on said line switches of the apparatus termination corresponding to a registered line numerical designation previously ascertained to represent local terminating traffic.

3. An automatic switching system having a plurality of lines each of which is identifiable by an address code comprising a central office designation and an individual numerical designation; said system comprising a switching center having apparatus terminations for local terminating traffic and for other traffic, first register means for registering a numerical designation, a translator, first ascertaining means including said translator for ascertaining first information defining the type of traffic represented by a registered numerical designation, said first ascertaining means comprising second register means controlled by said translator for registering said first information, and second ascertaining means including said translator and responsive to said second register means for ascertaining second information identifying the apparatus termination location corresponding to a registered numerical designation previously ascertained to represent local terminating traffic.

4. An automatic telephone system having a plurality of lines and employing a plurality of address codes each of which comprises a common central office designation and an individual numerical designation, said lines identifiable in common by said central office designation and discretely identifiable by said numerical designations; said system comprising a switching center including switching apparatus having terminations therein for local terminating calls and for other calls, first register means for registering one of said address codes, a translator, first ascertaining means including said translator and responsive to said first register means for ascertaining first information defining the type of call represented by the numerical designation of a registered address code, said first ascertaining means comprising second register means controlled by said translator for registering said first information, and second ascertaining means including said translator and responsive to said first register means and said second register means for ascertaining second information identifying the apparatus termination location corresponding to said registered numerical designation if said first information defines a local terminating call.

5. An automatic switching system having a plurality of lines each of which is identifiable by an address code unique thereto within said plurality, each of said codes comprising a central office designation and an individual numerical designation; said system comprising a switching center including controllable switching apparatus having local terminations therein for local lines to which direct connections can be effected by said apparatus for local terminating traffic, each of said local terminations individually associated with an apparatus location corresponding to the numerical designation of one of said local lines, said switching apparatus having other terminations therein to which connection can be effected by said apparatus for traffic other than local traffic, first register means for registering a numerical designation, a translator, first ascertaining means including said translator and responsive to said first register means for ascertaining first information defining the type of traffic represented by a registered numerical designation, said first ascertaining means comprising second register means controlled by said translator for registering said ascertained first information, second ascertaining means including said translator and responsive to said first register means and said second register means for ascertaining second information identifying the apparatus termination location corresponding to a registered numerical designation previously ascertained to represent local terminating traffic, and means controlled by said first and second ascertaining means for controlling said switching apparatus to effect connections to said local terminations for local terminating traffic and controlled by said first ascertaining means to effect connections to said other terminations for traffic other than local terminating traffic.

6. An automatic switching system employing a plurality of address codes each of which comprises a first or a second central office designation and an individual numerical designation, and having a plurality of lines each of which is identifiable by one of said numerical designations; said system comprising a switching center having individual apparatus terminations therein for each of said lines, first register means for registering a numerical designation and a central office designation, a translator, ascertaining means including said translator and controlled by said first register means for ascertaining information indicating with which of said first and second central office designations a registered numerical designation is associated and indicating the apparatus termination location of the line identified by said registered numerical designation, said ascertaining means comprising comparing means controlled by said translator and said first register means for comparing said indicated central office designation with a registered central office designation, means controlled by said comparing means for indicating a failure when said indicated central office designation and said registered central office designation differ, and means controlled by said ascertaining means for effecting connections to said apparatus terminations in accordance with said indicated apparatus termination location.

7. An automatic telephone system employing a first plurality of address codes each of which comprises a first common central office designation and an individual numerical designation, employing a second plurality of address codes each of which comprises a second common central office designation and an individual numerical designation, each of said numerical designations of said first and second pluralities of address codes being unique to one of said first and second central office designations, and having a plurality of lines each of which is identifiable by one of said address codes; said system comprising a switching center having apparatus terminations for local terminating traffic and for other traffic, first register means for registering an address code, a translator, first ascertaining means including said translator and responsive to said first register means for ascertaining first information indicating the type of traffic represented by the numerical designation of a registered address code and indicating the central office designation to which said registered numerical designation is unique, said first ascertaining means comprising checking means controlled by said first register means and said translator for verifying the identity of said indicated central office designation with the central office designation of said registered address code and second register means controlled by said checking means for registering said indicated type of traffic when said indicated central office code designation and said registered central central code designation are identical, second ascertaining means including said translator and responsive to said first register means and said second register means for ascertaining second information defining the apparatus termination location corresponding to the numerical designation of a registered address code previously indicated by said first information to represent local terminating traffic, said second ascertaining means comprising third register means controlled by said translator for registering said second information, and means controlled by said first and second ascertaining means for effecting connections to said apparatus terminations in accordance with said first and second information.

8. An automatic telephone system employing a plurality of address codes each of which comprises a common central office designation and an individual numerical designation; said system comprising a first switching center having terminations therein for a first group of lines and a second switching center having terminations therein for a second group of lines, each of said lines in said first and second groups of lines individually identifiable by a unique one of said numerical designations, a translator in said first switching center, first register means in said first switching center for registering a numerical designation, first ascertaining means in said first switching center including said translator and responsive to said first register means to ascertain first information indicating with which of said groups of lines a registered numerical designation is associated, said first ascertaining means comprising second register means for registering said first information, second ascertaining means responsive to said second register means and said first register means to ascertain second information defining the line termination location corresponding to a registered numerical designation previously indicated by said first information to be associated with said first group of lines, means controlled by said first and second ascertaining means for effecting connections to said terminations in said first switching center responsive to registered numerical designations indicated by said first information to be associated with said first group of lines, and means controlled by said first ascertaining means for effecting connections to said terminations in said second switching center responsive to registered numerical designations indicated by said first information to be associated with said second group of lines.

9. An automatic switching system having a plurality of lines each of which is identifiable by a unique one of a plurality of address codes, each of which codes comprises a first or a second central office designation and an individual numerical designation; said system comprising a first switching center identifiable by said first and second central office designations and a second switching center identifiable by said first and second central office designations, said first switching center having apparatus terminations therein for local terminating traffic and for other traffic, first register means in said first switching center for registering a central office designation and a numerical designation, a translator in said first switching center, first ascertaining means including said translator and responsive to said first register means to ascertain first information indicating with which of said switching centers a registered numerical designation is associated and indicating with which of said central office designations said registered numerical designation is associated, said first ascertaining means comprising comparing means controlled by said first register means and said translator for comparing the central office designation indicated by said first information with a registered central office designation and second register means controlled by said translator and said comparing means for registering said first information if said registered central office designation and said indicated central office designation are identical, means controlled by said comparing means for indicating a failure when said indicated central office designation and said registered central office designation differ, second ascertaining means including said translator and responsive to said second register means and said first register means to ascertain second information defining the apparatus termination location corresponding to said registered numerical designation if previously indicated by said first information to be associated with said first switching center, said second ascertaining means comprising third register means controlled by said translator for registering said second information, and means controlled by said first and second ascertaining means for effecting connections to said apparatus terminations in accordance with said first information and said second information.

10. An automatic switching system employing a plurality of address codes each of which comprises a first or a second central office designation and an individual numerical designation and having a first and a second group of lines to one of which groups each of said numerical designations is unique, each of said lines of said first and second groups of lines uniquely identifiable by an individual numerical designation; said system comprising a first switching center identifiable by both said first and second central office designations and having individual apparatus terminations therein for each line of said first group of lines, a second switching center identifiable by both said first and second central office designations and having individual apparatus terminations therein for each line of said second group of lines, first register means in said first switching center for registering a numerical designation, a translator in said first switching center, first ascertaining means including said translator and responsive to said first register means to ascertain first information indicating in which of said switching centers the line identified by a registered numerical designation is terminated and indicating with which of said central office designation said identified line is associated, second ascertaining means including said translator and controlled by said first ascertaining means for ascertaining second information defining the apparatus termination location corresponding to said registered numerical designation if previously indicated by said first information to identify a line terminated in said first switching center, means controlled by said first and second ascertaining means for effecting connections to said apparatus terminations for said first group of lines responsive to registered numerical designations indicated by said first information to identify lines terminating in said first switching center, and means controlled by said first ascertaining means for effecting connections to said apparatus terminations for said second group of lines responsive to registered numerical designations indicated by said first information to identify lines terminating in said second switching center.

References Cited in the file of this patent

UNITED STATES PATENTS

| | | |
|---|---|---|
| 2,876,288 | Brooks et al. | Mar. 3, 1959 |
| 2,932,695 | Gohorel | Apr. 12, 1960 |